United States Patent [19]
Delricco

[11] Patent Number: 5,505,015
[45] Date of Patent: Apr. 9, 1996

[54] FISHING LURE

[75] Inventor: James Delricco, 20316 98th St., Bristol, Wis. 53104

[73] Assignee: James Delricco, Highwood, Ill.

[21] Appl. No.: 188,317

[22] Filed: Jan. 28, 1994

[51] Int. Cl.$^6$ .................................................. A01K 85/00
[52] U.S. Cl. ........................................... 43/42.13; 43/44.2
[58] Field of Search ........................... 43/42.08, 42.09, 43/42.11, 42.12, 42.13, 42.38, 43.1, 43.12, 44.2, 44.4, 44.6, 44.8, 42.06

[56] References Cited

U.S. PATENT DOCUMENTS

| | | | |
|---|---|---|---|
| 2,471,499 | 5/1949 | Shipman | 43/42.13 |
| 2,621,437 | 12/1952 | Pedranti | 43/42.11 |
| 2,741,060 | 4/1956 | Rowlance | 43/44.4 |
| 2,775,058 | 12/1956 | Roberts | 43/44.4 |
| 2,896,360 | 7/1959 | Lucas | 43/44.2 |
| 3,046,691 | 7/1962 | Courtright | 43/44.6 |
| 4,471,558 | 9/1984 | Garcia | 43/44.4 |
| 4,640,041 | 2/1987 | Stanley | 43/42.13 |
| 4,972,623 | 11/1990 | Delricco | 43/42.06 |

Primary Examiner—Maurina T. Rachuba
Assistant Examiner—Chuck Y. Mah
Attorney, Agent, or Firm—Hill, Steadman & Simpson

[57] ABSTRACT

A fishing lure has a wire portion formed into two loops arranged side-by-side, an extension extending forwardly from the loops, and an extension extending rearwardly from the loops. A hook is fastened to the rearward extension. Movement of the rearward extension relative to the forward extension causes at least one of the loops to expand in diameter. A body having a generally spherical portion is held between the two loops. Enlargement of the loops permits the body to be removed and exchanged for another body, such as of a different color, size and/or shape. Quick change of the bodies is thereby possible.

8 Claims, 1 Drawing Sheet

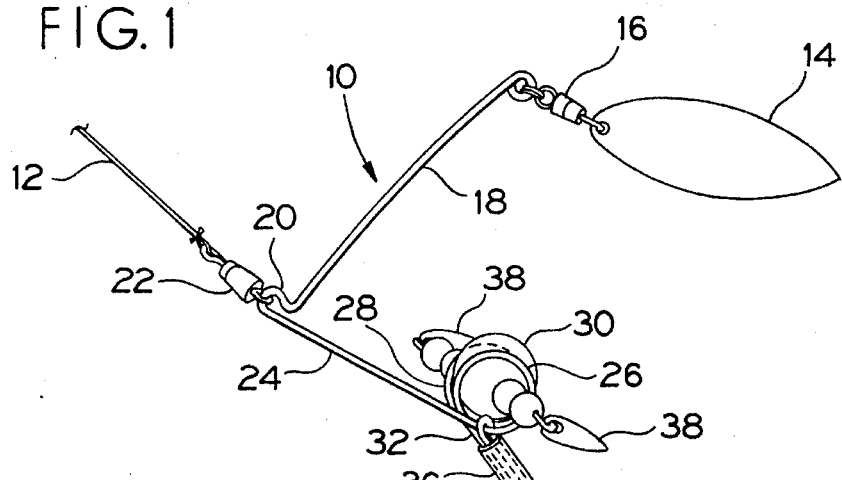
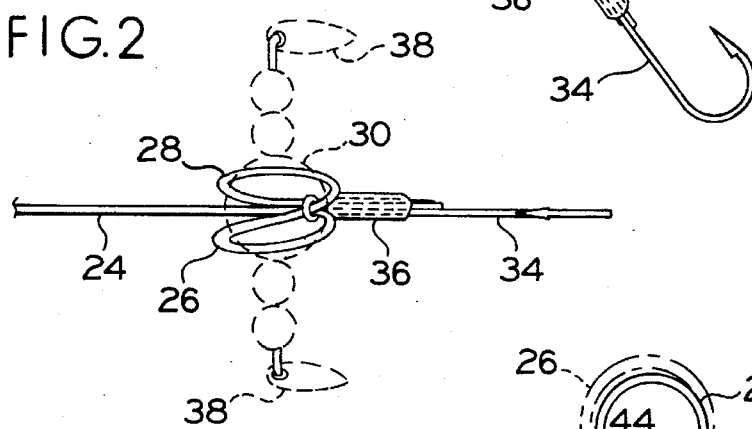
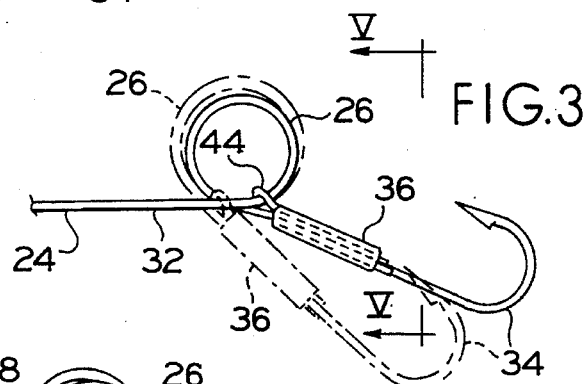
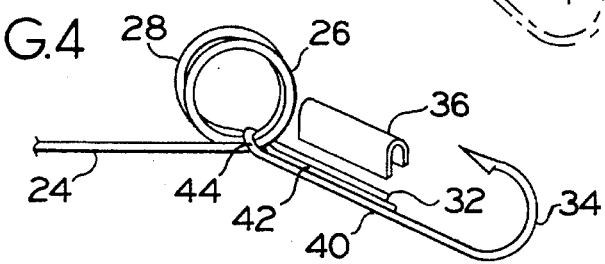
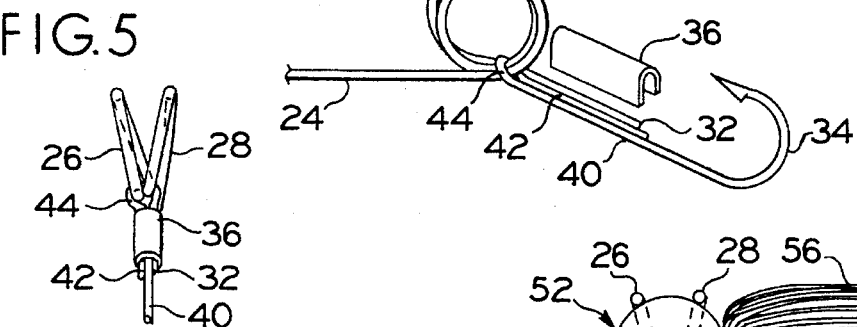
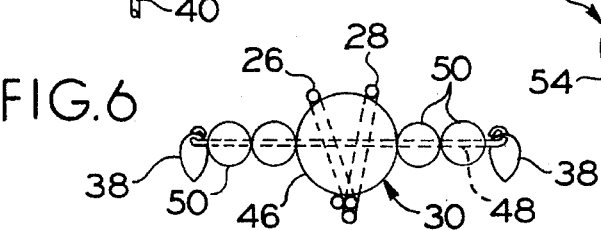
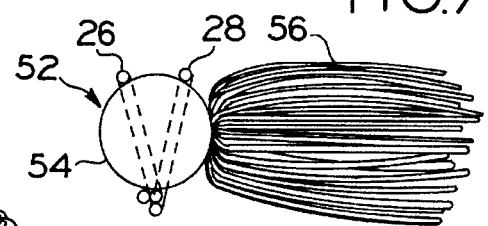

FISHING LURE

BACKGROUND OF THE INVENTION

1. Field of the Invention

The present invention relates generally to a fishing lure, and more particularly, to a fishing lure having a body that is removably fastened to the lure.

2. Description of the Related Art

While fishing, fishermen and fisherwomen often desire to change the fishing lure they are currently using for another lure of a different color or shape or action in hopes of catching more fish. Lures are often repeatedly changed in hopes of finding the "right" lure to catch the most fish. This is as often due to the fickle nature of the fishermen as to the fickle nature of the fish. However, changing lures is a frustrating element of fishing, usually involving cutting the old lure from the end of the line and tying on the new one. Modern materials used in fishing lines require tying of complicated knots, which can fail if tied improperly, resulting in loss of the lure. It would therefor be beneficial and desirable to provide fishing lures with interchangeable elements.

Fishing lures are known which have interchangeable bodies. For example, U.S. Pat. No. 4,972,623 discloses a fishing lure having a ball held by two spring loops on the shank of a hook. The ball may be removed and replaced by forcing the loops apart and moving the ball between the two loops.

SUMMARY OF THE INVENTION

An object of the present invention is to permit quick changing of a fishing lure without requiring retying to the fishing line.

Another object of the invention is to removably hold different sizes and shapes of bodies on a fishing lure.

A further object is to provide a removable fishing lure body which is held more tightly to the lure when a fish is caught.

These and other objects and advantages of the present invention are provided by a fishing lure with a holder, a body held in the holder, and removal means for removably replacing the body in the holder, the means being operable to enlarge the holder in diameter to accommodate bodies of different sizes and to accommodate bodies which are to be inserted into the holder through the enlarged diameter holder.

The holder includes a pair of loops of spring wire between which a generally spherical portion of the body is held. The means for removably replacing the body in the holder is two extensions of wire extending in generally opposite directions from the holder. By bending the two extension portions of the lure relative to one another, at least one of the two loops of the holder enlarges in diameter to release the body. A different lure body can then be inserted between the loops, so that the color, shape, reflective characteristics, or other features of the lure can be changed by only changing the body portion. The spring characteristics of the wire cause the loops to return to their smaller diameter to engage the body when the extension portions are permitted to return to their original positions. The loops of the holder are preferably flexible enough to accommodate bodies of different sizes, and of different shapes. Since the loops enlarge in diameter for removal and insertion of the bodies, bodies can be inserted through the enlarged loop, such as bodies having laterally extending portions, such as spinners, skirts, arms, or legs which could not otherwise be inserted between and held by the loops. Therefore, the bodies can be of a variety of shapes, including being shaped as frogs, insects, or other small animals or things.

Generally, one of the extensions of the removal means is connected to the fishing line and the other is connected to at least one hook. With the hook connected to one of the extensions and the line connected to the other extension, the tension on the two extensions as the result of a fish caught on the hook results in the body being engaged even more tightly as the loops are drawn smaller by the tension on the hook. In other words, when a fish is caught on the hook and is being retrieved, the tension on the loops engages the body more tightly to prevent release of the body from the lure. One embodiment has a single hook connected to the rearward extension and a portion of the hook shank extending through the loops. By connecting the hook to the extension, the hook can be grasped for releasing the body from the holder. The hook shank extending through the loops prevents the hook from being pulled off the extension.

The forward extension of the removal means is generally connected to the fishing line, either directly or indirectly, such as by a swivel. The forward extension can include a spinner, an lure body, propellers, beads or other fish attractors as desired. Either the forward or rearward extension may also include weights for deeper running or floats, spoons, lips, or blades, control the action or depth of running of the lure. If an eyelet for tying on the fishing line is provided on a short forward extension of the removal means, a lure in the form of a jig for bottom feeding fish is provided. If the forward extension includes a spinner, then a spinning jig, or spinner bait, is formed for predator fish such as bass or pike. By providing a longer forward extension with propellers or the like, a salmon lure can be formed for lake salmon. An embodiment is contemplated having two holders for two bodies, either in side-by-side arrangement or in line with one another.

The loops need not be round but may be of various shapes to accommodate bodies of different configurations. Further, the present holder loops need not be used with a spinner, but can be used with many different lures.

Other variations using the holder and replaceable bodies of the present invention will become readily apparent upon review of the following.

BRIEF DESCRIPTION OF THE DRAWINGS

FIG. 1 is a side view of a fishing lure according to the principles of the present invention;

FIG. 2 is a top plan view of the holder portion of the fishing lure of FIG. 1;

FIG. 3 is a partial side view of the fishing lure of FIG. 1, showing in dotted outline the enlargement of the holder by bending the hook relative to the holder;

FIG. 4 is an exploded view of the hook and holder being assembled by a crimp member;

FIG. 5 is an end view of the holder of FIG. 3, in the direction of the line V—V;

FIG. 6 is a plan view of a body held in the holder of the invention, the body having lateral spinners; and FIG. 7 is a plan view of another embodiment of a body held in the holder of the invention.

DETAILED DESCRIPTION OF THE PREFERRED EMBODIMENTS

In FIG. 1, the fishing lure 10 of the present invention is tied or otherwise fastened to a fishing line 12 so that the lure 10 can be drawn through the water to attract and catch fish. The embodiment of the lure 10 shown in FIG. 1 is a so-called spinning jig, or spinner bait, having a spinner blade 14 on a swivel 16 that is attached to a spinner set-off arm 18, the base of which has a fishing line connection location 20. A second swivel 22 is attached to the nearly 360° bend that forms the line connection location 20. A length of wire 24 of which the lure is primarily formed extends as the forward extension of the removal means from the connection location 22 to holder loops 26 and 28. The loops 26 and 28 lie on either side of a body 30 and act to hold the body 30 in place on the lure 10. A rearward extension, or stabilizer wire, 32 of the removal means extends rearward from the loops 26 and 28 and a hook 34 is mounted to the extension 32. In the illustrated embodiment, a crimp 36 affixes the hook 34 to the rearward extension 32. The rearward extension or stabilizer 32 of one embodiment is approximately 1 inch in length.

The body 30 of the embodiment shown in FIG. 1 includes small spinners 38 extending laterally from each side thereof. The small spinners 38 and the large spinner 14 rotate and move as the lure is drawn through the water to attract fish. Once attracted, the fish strike and are caught on the hook 34 so that they can be retrieved to the fisherman or woman. The body 30 can be easily and quickly exchanged for other bodies, as will be described hereinafter.

A contemplated embodiment replaces the large spinner 14 and swivel 16 of FIG. 1 with a second pair of holder loops, possibly including another hook. In this way, two bodies can be connected in the lure, one in each of the two holders. The two bodies may be arranged to travel through the water side-by-side or with one behind the other.

In FIG. 2, the top view of the lure shows that a continuous length of the wire 24 is bent to form the two loops 26 and 28 and the extension 32. The loops 26 and 28 are in side-by-side arrangement with a common point of connection at their circumference. The body 30 is attached with an enlarged portion, preferably but not necessarily, of a generally spherical shape between the loops 26 and 28. In embodiments having more than one such holder, each is formed of a continuous length of wire bent into two side-by-side loops.

Referring to FIG. 3, the loops 26 and 28 may be enlarged in diameter by moving the rearward extension 32 and the hook 34 relative to the wire 24 to the position shown in dotted outline. This bending movement enlarges the diameter of at least one of the two loops 26 and 28 so that the body 30 can be removed. A different body of a different color, shape, or size can then be inserted between the two loops 26 and 28. While it is possible with bodies that are strictly spherical to insert them between the loops 26 and 28 from above by forcing the loops apart, the enlargeable loops of the present invention enable a wider variety of bodies to be used. For example, the body shown in FIGS. 1 and 2 with extensions from opposite sides can be inserted from the side through an enlarged loop but could not be inserted by pressing between the loops. The loops 26 and 28 can be enlarged by bending the extensions 24 and 32 relative to one another to accommodate bodies of different sizes.

FIG. 4 illustrates the assembly of the holder loop means 26 and 28 to the hook 34 of the preferred embodiment. The extension 32 of the wire 24 from the loops 26 and 28 is positioned parallel to a shank 40 of the hook 34. The shank 40 is formed with a substantially 180° bend and so has a return portion 42 that lies along side the shank 40 extending from the U-shaped bend. The U-shaped bend is placed around at least one and preferably both of the two loops 26 and 28. With the shank 40 and return portion 42 lying adjacent to the extension 32, a crimp piece 36 if fastened about the extension, shank and return portion and crimped in place. Instead of the sheet metal crimp piece 36 as shown, it is possible to wire wrap the extension 32, shank 40 and return portion 42 together, or to solder, weld, or otherwise fasten these parts to one another.

The crimp piece 36 should be fastened to hold the hook in place but should not close the U-shaped bend 44 about the loops 26 and 28. Instead, the U-shaped bend 44 forms an eyelet which permits the wire of the loops 26 and 28 to slide therethrough as the hook 34 and wire 24 are bent relative to one another to enlarge the loops 26 and 28, as shown in FIG. 3. The loops must be free to move through the U-shaped bend 44.

While a single hook 34 is shown, it is also contemplated to use a double hook or a treble hook, or some other hook configuration. An eyelet may be formed in the end of the rearward extension 32 and an eyelet of a hook may be fastened thereto to provide a hook that is movable relative to the holder and body. Additional hooks connected in series may also be used.

A further embodiment utilizes the holder loops 26 and 28 and forward and rearward extensions 24 and 32 without attachment to a hook. In this embodiment, the ends of the extensions 24 and 32 includes means for connection to a fishing line, such as eyelets, and the fishing line is connected to each end. For example, this embodiment may be connected up the line from another lure or hook. Instead of the eyelets, the ends of the extensions may have "S" shaped bends through which the fishing line is woven to fasten the lure along a length of the fishing line, such as in front of a hook. This arrangement permits the lure to slide along the line.

The engagement of the U-shaped portion 44 about the loops 26 and 28 is seen more clearly in FIG. 5. The lure 10 is thus formed of a wire 24 that has a springy characteristic and a separate hook 34 fastened thereto. This enables a wire 24 to be used that has the desired resilience to flex for enlargement of the loop diameter and return to its original shape, while using a hook 34 of tempered steel which has a strong and durable point and barb. The U-shaped bend 44 extending through the loops 26 and 28 also makes for a greater strength in the lure, as the lure 10 cannot be pulled apart by a strong or heavy fish. The hook 34 having the shank 40 ending in a U-shaped bend 44 with a return portion 42 extending back along the shank 40 has provided the most beneficial design for the present invention.

It is within the scope of the present invention, however, to make the loops and hook in one piece if properly tempered material for the point and barb of the hook is provided on the springy material than is used for the loops of the holder.

The present invention eliminates the need for the use of lead, which has been found to have an adverse environmental effect, to be used in the manufacture of the present lure.

Referring to FIG. 6, the loops 26 and 28 encircle either side of a spherical central portion 46 of the body 30. A shaft 48 on which is mounted beads 50 and the small spinners 38 extend laterally through the central portion 46. These laterally extending elements 48, 50 and 38 prevent mounting of the body 30 in a direction between the loops 26 and 28. Instead, the body 30 is inserted through one of the loops 26 and 28 as their diameter is enlarged by bending the hook 34 relative to the wire 24.

Another embodiment of a body 52 is shown in FIG. 7. This embodiment has a generally spherical portion 54 that is of a larger diameter than the body of FIGS. 1, 2, and 6. The larger diameter body 52 is accommodated in the loops 26 and 28 due to their spring characteristic. A rubber skirt 56 extends from one side of the portion 54. The body 52 may be placed into the holder loops 26 and 28 so that the rubber skirt 56 extends to the side, the front, or the rear. It is contemplated to use a generally spherical body in the holder loops which is of a small enough diameter to rotate and move within the holder yet still remain held by the loops. A skirt on such small body would then pivot relative to the lure as the lure first falls through the water and then is drawn upward, making the lure more attractive to fish.

An embodiment is contemplated having two rubber skirts, one extending from each side of the portion 54. Alternate embodiments of the body may be of rubber, plastic, glass, wood, or any other sinking or floating material used for fishing lures. The body may be of any combination of colors, may be reflective, or includes glitter or other optical effects or may be representative of live bait. For instance, a rubber body having legs or tails, such as rubber worms, frogs or mice, may be inserted in the loops. The body can also be in the shape of a fish. A body having a concave of flat front surface may be used to provide a popping action to the lure.

The present invention enables a wide range of lure bodies to be used without retying each lure to the line. Only one tie-on is required for the hook and holder loops. It is contemplated to furnish the hook and holder loops in a kit with a number of different bodies, with or without a spinner.

Although other modifications and changes may be suggested by those skilled in the art, it is the intention of the inventor to embody within the patent warranted hereon all changes and modifications as reasonably and properly come within the scope of his contribution to the art.

I claim:

1. A fishing lure comprising:

a body having an at least generally spherical portion;

a body holder of spring steel formed into a pair of loops engageable on opposite sides of said at least generally spherical portion, at least one of said loops being variable in diameter by bending of said spring steel, said body holder including a forward extending portion and a rearward extending portion, said forward extending portion including means for attachment of a fishing line, said rearward extending portion being movable relative to said forward extending portion to cause variation in diameter of said at least one loop; and a hook fastened to said rearward extending portion, wherein said hook includes a shank having a substantially 180° bend at an end opposite a hook point, said end having said substantially 180° bend passing through at least one of said loops.

2. A fishing lure as claimed in claim 1, further comprising: a return portion extending substantially parallel to said shank from said substantially 180° bend, said shank and said return portion being fastened to said rearward extending portion.

3. A fishing lure as claimed in claim 2, further comprising:

a crimp piece crimped tightly about said rearward extending portion and said return portion and said shank.

4. A fishing lure comprising:

a length of spring steel wire formed into two loops having a common starting point and extending at an acute angle from one another, portions of said spring steel wire extending in opposite direction from said common starting point, said two loops being free from fastening to permit enlargement in diameter of at least one of said two loops by bending said oppositely extending portions relative to one another;

a body held between said two loops by spring force of said spring steel wire, said body being selectively releasable from between said two loops by bending said oppositely extending portions relative to one another to enlarge a diameter of said at least one loop; and a hook of tempered steel having a barb at a first end and a shank at a second end, said shank being fastened to one of said oppositely extending portions, wherein said shank of said hook includes a substantially 180° bend so that a return portion lies substantially parallel to said shank, said substantially 180° bend extending through said two loops, and further comprising:

means fastening said substantially parallel portions of said shank to one of said oppositely extending portions.

5. A fishing lure as claimed in claim 4, wherein said means fastening said substantially parallel portions to said oppositely extending portion comprises a crimp piece fastened tightly about said parallel portions and said oppositely extending portion, said substantially 180° bend being sufficiently open to permit expanding and alternately contracting movement of at least one of said loops through said substantially 180° bend as said oppositely extending portions are bent relatively to one another.

6. A fishing lure comprising:

a length of spring steel wire formed into two loops having a common starting point and extending at an acute angle from one another, portions of said spring steel wire extending in opposite direction from said common starting point, said two loops being free from fastening to permit enlargement in diameter of at least one of said two loops by bending said oppositely extending portions relative to one another;

a body held between said two loops by spring force of said spring steel wire, said body being selectively releasable from between said two loops by bending said oppositely extending portions relative to one another to enlarge a diameter of said at least one loop; and a hook of tempered steel having a barb at a first end and a shank at a second end, said shank being fastened to one of said oppositely extending portions;

wherein said body comprises:

a central generally spherical portion;

laterally extending spinner supports extending from opposite sides of said central generally spherical portion, said body being removably mountable with said central generally spherical portion between said two loops so that one of said laterally extending spinner supports extends through each of said two loops, said body being selectively removable from said two loops by enlargement of at least one of said two loops and passing said central generally spherical portion through said at least one loop.

7. A method for making a fishing lure, comprising:

bending a length of spring steel wire into two loops having a common point of connection on their circumferences;

forming a first portion of said spring steel wire extending in a first direction from said two loops into a connecting portion to which fishing line is attachable;

leaving a second portion of said spring steel wire extending in a second direction from said two loops opposite said first direction;

fastening a shank of a fishing hook to said second portion of said spring steel wire; and inserting a body between said two loops;
wherein said fastening step includes:
   passing a bend in said shank of said fishing hook through at least one of said two loops.

8. A method for exchanging bodies on a fishing lure having two loops of wire engaging opposite sides of a body, a hook extending a first direction from the two loops and a line connection portion extending in a second direction from said two loops, comprising:

engaging said hook and said line connection portion;

bending said hook and said line connection portion toward one another so as to enlarge a diameter of at least one of the loops;

removing the body through said at least one enlarged loop;

inserting another body between said loops; and permitting said hook to return to a position reducing the diameter of said at least one of the loops.

* * * * *